US010496581B2

(12) United States Patent
Lin et al.

(10) Patent No.: US 10,496,581 B2
(45) Date of Patent: Dec. 3, 2019

(54) UN-SAMPLED DECISION FEEDBACK EQUALIZER INCLUDING CONFIGURABLE LOOP DELAY

(71) Applicant: Intel Corporation, Santa Clara, CA (US)

(72) Inventors: Charlie Changhong Lin, Cupertino, CA (US); Harry Muljono, Union City, CA (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 15/084,876

(22) Filed: Mar. 30, 2016

(65) Prior Publication Data

US 2017/0285683 A1    Oct. 5, 2017

(51) Int. Cl.
*H03H 7/30* (2006.01)
*G06F 13/40* (2006.01)

(52) U.S. Cl.
CPC ................... *G06F 13/4022* (2013.01)

(58) Field of Classification Search
CPC .................................................. G06F 13/4022
See application file for complete search history.

(56) References Cited

U.S. PATENT DOCUMENTS

| 7,697,603 B1 | 4/2010 | Wang et al. | |
| 8,164,499 B1 * | 4/2012 | Booth | H03M 1/662 338/309 |
| 8,861,667 B1 * | 10/2014 | Zerbe | H04L 7/0087 375/371 |
| 9,231,793 B1 * | 1/2016 | Vareljian | H04L 25/03057 |
| 2012/0128055 A1 | 5/2012 | Jiang | |

FOREIGN PATENT DOCUMENTS

| WO | 2010024051 | 3/2010 |
| WO | 2017172147 | 10/2017 |

OTHER PUBLICATIONS

Kaviani, Kambiz, et al., "A 6.4Gb/s Near-Ground Single-Ended Transceiver for Dual-Rank DIMM Memory Interface Systems", ISSCC 2013 / Session 17 / High-Performance DRAM Interfaces / 17.1, (Feb. 20, 2013), 3 pgs.
Lee, Soo-Min, et al., "A 27% Reduction in Transceiver Power for Single-Ended Point-to-Point DRAM Interface with the Termination Resistance of 4×Z0 at both TX and RX", ISSCC 2013 / Session 17 / High-Performance DRAM Interfaces / 17.2, (Feb. 20, 2013), 3 pgs.
"International Application Serial No. PCT US2017 019429, International Search Report dated May 24, 2017", 3 pgs.
"International Application Serial No. PCT US2017 019429, Written Opinion dated May 24, 2017", 6 pgs.

* cited by examiner

*Primary Examiner* — Dhaval V Patel
(74) *Attorney, Agent, or Firm* — Schwegman Lundberg & Woessner, P.A.

(57) ABSTRACT

Some embodiments include apparatus and methods using circuits to receive an input signal, generate an equalized signal, provide the equalized signal to a node, amplify the equalized signal, and generate digital input information from the equalized signal. A delay circuit, including delay elements, is provided to apply a time delay to the digital input information and generate digital output information. A selector in the delay circuit provides feedback information from an output node of one of the delay elements. An adjust circuit, including switches on circuit paths coupled to the node, is provided to control the switches based on the feedback information.

20 Claims, 6 Drawing Sheets

UN-SAMPLED DECISION FEEDBACK EQUALIZER INCLUDING CONFIGURABLE LOOP DELAY

TECHNICAL FIELD

Embodiments described herein pertain to receiver circuitry. Some embodiments relate to equalizers in receivers.

BACKGROUND

Many electronic devices or systems, such as computers, tablets, and cellular phones, include receivers to receive signals. The signals carry information (e.g., data) transmitted from one device to another device. Equalizers are usually used to improve the quality of the signals received at the receiver. A decision feedback equalizer (DFE) is one type of equalizer. A conventional DFE has decision circuitry (e.g., a sampling slicer) to sample the signal as part of an equalization operation performed by the DFE. In some conventional DFEs, such decision circuitry may have timing constraints, complex structures, and high power consumption. These factors may make some conventional DFEs unsuitable to be used in some receivers.

DETAILED DESCRIPTION

The technique described herein includes a DFE that may be used in a receiver that receives information (e.g., data signals) transferred to the receiver at relatively high speed (e.g., up to $3.2 \times 10^9$ transfers per second (which is 3200 megatransfers per second (MT/s)) or higher). A conventional data DFE or an edge-based DFE is often used to improve the vertical and horizontal eye openings of the DFE output. However, a data DFE may provide the maximum vertically eye opening and an edge-based DFE may provide the maximum horizontal eye opening. The DFE described herein may be arranged to perform as either a data DFE or an edge-based DFE and may give a better result than either a conventional data DFE or a conventional edge-based DFE. Additionally, the DFE described herein may be arranged to perform some functions of a conventional DFE and some functions of a conventional edge-based DFE and achieve the benefits that may be close to those of both conventional data and edge-based DFEs.

Conventional data and edge-based DFEs are typically implemented through sampled DFE architecture, which often includes sampled decision circuitry (e.g., docked flip-flops that functions as the slicer). Such conventional DFE structure may face some challenges. For example, first post cursor tap timing for a feedback path of the conventional DFE may be very tight relative to the unit symbol (UI) of the signal received at the receiver. Some conventional DFEs try to relax this timing by using some DFE schemes, such as a DFE loop unrolling. However, this scheme usually needs additional circuitry, leading to an increase in DFE circuit complexity and cost. In another example, in a conventional DFE, the DFE eye opening (e.g., the eye opening of the signal at the output of the DFE) may not be obtained by margining the receiver clock (e.g., the DFE clock) because error propagation in higher bit error rate (BER) region of the eye opening may significantly damage the eye opening.

In the technique described herein, the DFE has an un-sampled (e.g., continuous) DFE structure, such that decision circuitry of DFE can be arranged (e.g., configured) without conventional sampled (e.g., clocked) decision components. The described DFE may use no sampling clock in components of its decision circuitry. The described DFE can include a fine fractional loop delay. As described in more detail below, the un-sampled DFE technique may reduce (or eliminate) signal reflection and inter-symbol interference (ISI). The un-sampled DFE may not be limited to a non-integer multiple of UI of the input signal, and may reduce signal reflection across the width of the DFE eye opening (e.g., including reflection at locations other than the center and edges of the eye opening). The un-sampled DFE may also reduce circuit complexity, and improve (e.g., decrease) power consumption of the DFE.

Figure 1:
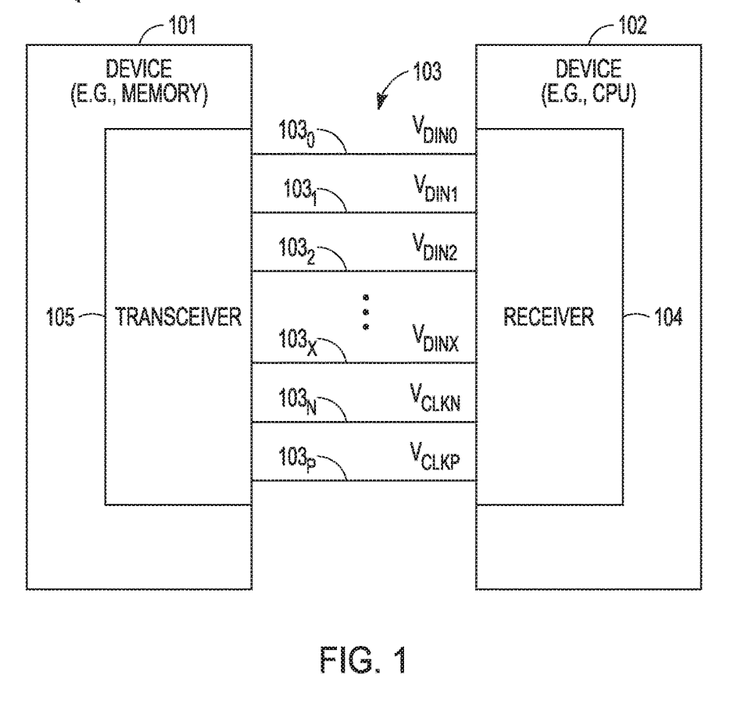
FIG. 1 shows an apparatus including devices and a channel between the devices, according to some embodiments described herein.

FIG. 1 shows an apparatus 100 including devices 101 and 102, and a channel 103 between devices 101 and 102, according to some embodiments described herein. Apparatus 100 can include or be included in an electronic device or system, such as a computer (e.g., server, desktop, laptop, or notebook), a tablet, a cellular phone, or other electronic devices or systems. Each of devices 101 and 102 can include an integrated circuit (IC), such as an IC chip. Devices 101 and 102 can include a combination of a controller (e.g., processors (e.g., central processing unit (CPU)), input/output controllers, or memory controller), a memory device, and or other electronic devices. FIG. 1 shows an example where device 101 can be a memory device and device 102 can be a CPU.

Devices 101 and 102 can include a transmitter 105 and a receiver 104, respectively. Channel 103 can provide communication (e.g., in the form of signal transmission) between devices 101 and 102. Channel 103 can include lanes $103_0$, $103_1$, and $103_2$ through $103_X$, $103_N$ and $103_P$ to conduct signals between devices 101 and 102. Each of lanes $103_0$, $103_1$, and $103_2$ through $103_X$ can be used carry a single-ended signal or alternatively a differential pair signal. Each of lanes $103_0$ through $103_X$ can include a single conductive trace (or alternatively multiple conductive traces), such as metal-based traces of a bus on a circuit board (e.g., printed circuit board of an electronic system) where devices 101 and 102 are located. In an alternative arrangement, channel 103 does not have to include conductive lines on a circuit board. For example, channel 103 can include a medium (e.g., air) for wireless communication between devices 101 and 102.

Devices 101 and 102 can communicate with each other by providing signals on lanes $103_0$ through $103_X$ and $103_N$ and $103_P$. As shown in FIG. 1, for example, transmitter 105 may transmit signals $V_{DIN0}$, $V_{DIN1}$, and $V_{DIN2}$ through $V_{DINX}$ to receiver 104 on one portion of channel 103 (e.g., on lanes $103_0$, $103_1$, and $103_2$ through $103_X$, respectively) and clock signals $V_{CLKP}$, and $V_{CLKN}$ on another portion of channel 103 (e.g., on lanes $103_N$ and $103_P$, respectively). Clock signals $V_{DIN0}$, $V_{DIN1}$, and $V_{DIN2}$ through $V_{DINX}$ can include timing information associated with transmission of signals $V_{DIN0}$, $V_{DIN1}$, and $V_{DIN2}$ through $V_{DINX}$.

As an example, device 101 can include a dynamic random access memory (DRAM) device, such that each of signals $V_{DIN0}$, $V_{DIN1}$, and $V_{DIN2}$ through $V_{DINX}$ can include a data signal (e.g., DQ) representing data information (e.g., data bits) transmitted from device 101 to device 102. In this example, each of clock signals $V_{CLKN}$ and $V_{CLKP}$ can include a strobe signal (e.g., DQS). Clock signals $V_{CLKN}$ and $V_{CLKP}$ can be a differential pair signal (e.g., clock signals $V_{CLKN}$ and $V_{CLKP}$ can be a "true" and "complimentary" signal pair). FIG. 1 shows two clock signals $V_{CLKN}$ and $V_{CLKP}$ as an example. The number of clock signals and timing signals can vary. Receiver 104 can include components and operations of the receivers described below with reference to FIG. 2 through FIG. 7.

Figure 2:
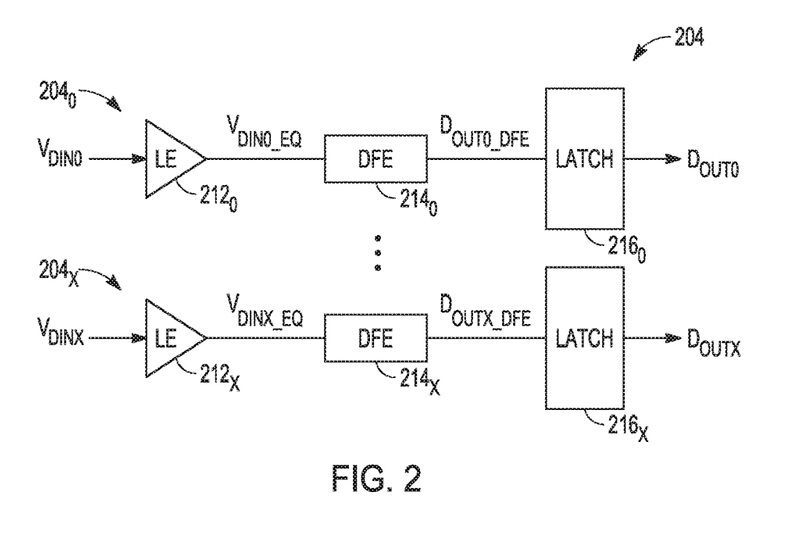
FIG. 2 shows a block diagram of diagram of a receiver including receiver lanes and DFEs, according to some embodiments described herein.

FIG. 2 shows a block diagram of a receiver 204 including receiver lanes $204_0$ through $204_X$ and decision feedback equalizers (DFEs) $214_0$ through $214_X$, according to some embodiments described herein. Receiver 204 can correspond to receiver 104 of FIG. 1. Each of receiver lanes $204_0$ through $204_X$ can perform an equalization operation on respective analog input signal to generate respective digital output information (e.g., bits of information).

For example, receiver lane $204_0$ can receive signal (e.g., analog input signal) $V_{DIN0}$ and generate information $D_{OUT0}$ (e.g., digital output information). Receiver lane $204_X$ can receive signal (e.g., analog input signal) $V_{DINX}$ and generate information (e.g., digital output information) $D_{OUTX}$. Each of information $D_{OUT0}$ and $D_{OUTX}$ can be represented by a digital signal that carries bits (e.g., data bits). Signals $V_{DIN0}$ and $V_{DINX}$ can be provided to receiver 204 by a transmitter, such as transmitter 105 of FIG. 1. Thus, signals $V_{DIN0}$ and $V_{DINX}$ can correspond to two of signals $V_{DIN0}$ through $V_{DINX}$ of FIG. 1. FIG. 2 shows an example where receiver 204 includes two receiver lanes $204_0$ through $204_X$. The number of receiver lanes can vary.

As shown in FIG. 2, receiver lane $204_0$ can include a linear equalizer (LE) $212_0$ (which can include a continuous time linear equalizer (CTLE)) and a latch $216_0$ coupled to DFE $214_0$. Equalizer $212_0$ can perform an equalization operation (e.g., a CTLE operation) to equalize (e.g., reduce noise) in signal $V_{DIN0}$ and generate signal (e.g., equalized signal) $V_{DIN0\_EQ}$. DFE $214_0$ can perform an equalization operation (e.g., DFE operation) on signal $V_{DIN0\_EQ}$ and generate information $D_{OUT0\_DFE}$, which is digital output information (e.g., information represented by a digital signal that carries bits, such as data bits). Latch 216 can operate to latch (e.g., capture) information $D_{OUT0\_DFE}$ and generate information $D_{OUT0}$.

In a similar arrangement, receiver lane $204_X$ can include LE $212_X$, DFE $214_X$, and latch $216_X$ coupled to DFE $214_X$. Similar to receiver lane $204_0$, receiver lane $204_X$ can operate to receive signal $V_{DINX}$ and generate signal $V_{DINX\_EQ}$ and information $D_{OUT0\_DFE}$ and $V_{OUT0}$.

Receiver 204 can include components and operations of the receivers described below with reference to FIG. 3 through FIG. 7.

Figure 3:
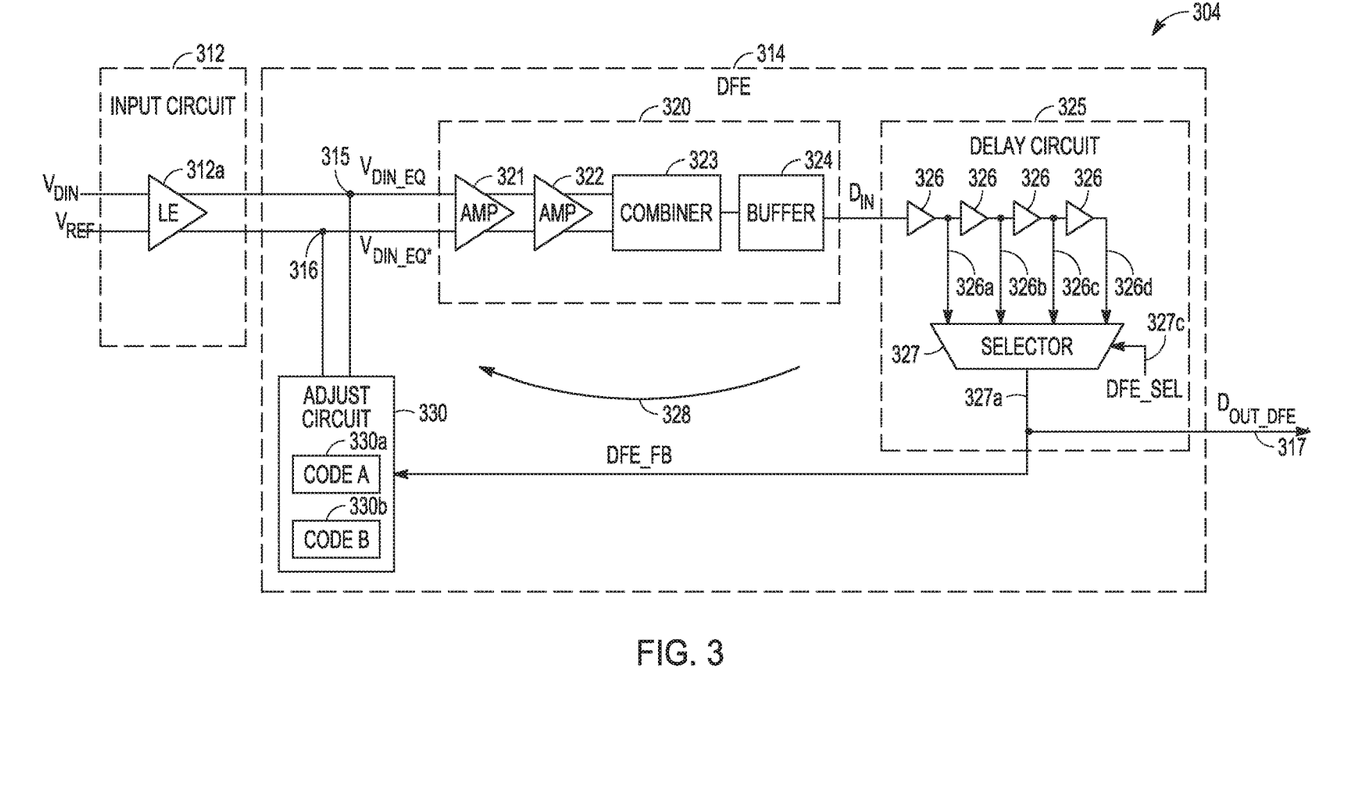
FIG. 3 shows a block diagram of diagram of a receiver including an input circuit and a DFE, according to some embodiments described herein.

FIG. 3 shows a block diagram of a receiver 304 including an input circuit 312 and a DFE 314, according to some embodiments described herein. Input circuit 312 and a DFE 314 can be part of a receiver lane similar to one of receiver lanes $204_0$ through $204_X$ of FIG. 2. As shown in FIG. 3, receiver 304 can receive a signal (e.g., analog input data signal) $V_{DIN}$ and a signal (e.g., analog input reference signal) $V_{REF}$ and generate information $D_{OUT\_DFE}$, which is digital output information (e.g., information represented by a digital signal that carries bits, such as data bits). Information $D_{OUT\_DFE}$ is a digital representation of signal $V_{DIN}$.

Signal $V_{DIN}$ (small swing analog signal) can be provided to receiver 304 from a transmitter, such as transmitter 105 of FIG. 1. Thus, signals $V_{DIN}$ can correspond to one of signals $V_{DIN0}$ through $V_{DINX}$ of FIG. 1. In FIG. 3, signal $V_{REF}$ can be generated (e.g., internally generated) by receiver 304 (or by a device 101 that includes receiver 304).

DFE 314 can include a circuit 320, a delay circuit 325, an adjust circuit 330, and a feedback loop 328. Feedback loop 328 can include at least a portion of delay circuit 325 and at least a portion of adjust circuit 330. As described in more detail below, DFE 314 has an un-sampled (e.g., continuous) DFE structure, such that decision circuitry (e.g., a combination of circuit 320 and delay circuit 325) of DFE 314 can be arranged (e.g., configured) without conventional sampled (e.g., clocked) decision components (e.g., without clocked comparator, symbol slicer, or other clocked components used to sample data). Thus, DFE 314 may use no sampling clock (e.g., may decouple a sampling dock) in circuit 320 and delay circuit 325. For example, receiver 304 may include a clock path (not shown in FIG. 3) to receive a clock signal (or alternatively a differential pair clock signal) associated with signal $V_{DIN}$. Receiver 304 may not use that clock signal to sample signals in DFE 314. Thus, that clock signal may be decoupled from (e.g., not used in) DFE 314 (e.g., decoupled from circuit 320 and delay circuit 325 of DFE 314).

In DFE 314, delay circuit 325 can provide a loop delay that has a time delay relative to (e.g., as a function of) the UI of signal $V_{DIN}$. The UI of signal $V_{DIN}$ is a portion (e.g., segment) of the signal $V_{DIN}$ within the UI, in which the portion is used to carry one bit (or multiple bits) of information (e.g., data). In FIG. 3, delay circuit 325 may provide a loop delay of X times T (X*T), where X is a real number, and T is equal to one UI of signal $V_{DIN}$. In DFE 314, delay circuit 325 can be tuned to provide a time delay, such that the loop delay of DFE 314 can be a fractional loop delay. This means that the value of X can be a non-integer. For example, the value of X can be greater than zero and less than one (0<X<1). In another example, the value of X can be greater than one and less than two (1<X<2). In some arrangement, the value of X can be an integer.

As an example where X is a non-integer, the fractional loop delay of DFE 314 can be 1.5 T (which is 1.5 UI) that makes DFE 314 to be equivalent to an edge-based DFE. Thus, DFE 314 may be arranged as a stand-alone edge-based DFE (e.g., without using it combination with a data DFE) but DFE 314 may still achieve the benefits of both data and edge-based DFEs (e.g., achieve improved horizontal and vertical data eye openings).

Some conventional DFEs use sampled decision circuitry (e.g., a sample slicer) that may limit the loop delay of the DFE to be an integer multiple of UI of the input signal. In DFE 314, by avoiding sampled decision circuit and by using delay circuit 325 (which can provide a fractional loop delay), DFE 314 may not be limited to a non-integer multiple of UI of the input signal. This allows DFE 314 to be relatively easily tuned (e.g., configured) in order to select the value (e.g., an optimal value) for the loop delay (e.g., a fractional loop delay) of DFE 314. This may also allow DFE 314 to achieve an intended result (e.g., best result) for the DFE output (e.g., an improved quality of the signal that represents information $D_{OUT\_DFE}$).

As is known to those skilled in the art, signal reflection may appear not necessarily at the center or the edges of the eye opening of signal at a receiver 304. Signal reflection may appear anywhere across the width of the eye opening. In DFE 314, delay circuit 325 and adjust circuit 330 may allow DFE 314 to reduce signal reflection across the width of the eye opening (e.g., including reflection at locations other than the center and edges of the eye opening). This further improves the quality of the signal that represents information $D_{OUT\_DFE}$.

Delay circuit 325 and adjust circuit 330 can be tuned, so that loop delay (e.g., fractional loop delay) of DFE 314 can be adjusted (e.g., until it is optimized) in finer granularity across the entire width of eye opening. This may cancel voltage shift, timing shift, or both (that may be caused signal reflection) and allow parameters (e.g., rectangular eye mask) of the input signals at receiver 304 to remains intact.

DFE 314 shows an example implementation of 1-tap fine fractional DFE. Delay circuit 325 can include components (e.g., delay elements 326) that are process, voltage, and temperature (PVT) compensated components. Delay circuit 325 can provide tapping points (e.g., delay tapping points), that can be selected during a tuning operation. A training algorithm (e.g., software) can be used during the tuning operation to obtain the intended (e.g., best) result (e.g., best data eye diagram (e.g., eye opening) for the signal that represents information $V_{OUT\_DFE}$). Alternatively, training of DFE 314 may be performed by firmware or hardware. The tuning operation may include observing the arrival of signal reflection in the signal (e.g., signal $V_{DIN}$) received at receiver 304 and reducing (or eliminating) such signal reflection.

In operation, input circuit 312 can perform a filtering (e.g., a CTLE) operation on signals $V_{DIN}$ and $V_{REF}$ and generate equalized signals $V_{DIN\_EQ}$ and $V_{DIN\_EQ}*$ at nodes 315 and 316. Signals $V_{DIN\_EQ}$ and $V_{DIN\_EQ}*$ can be combined (e.g., summed) with a signal (which represents feedback information DFE_FB) from a feedback loop 328 of DFE 314. Adjust circuit 330 can include a differential current digital-to-analog converter (DAC) that can be controlled by feedback information DFE_FB. Adjust circuit 330 can operate to adjust signals $V_{DIN\_EQ}$ and $V_{DIN\_EQ}*$ in order to reduce (or eliminate) signal reflection and ISI.

Circuit 320 and delay circuit 325 can provide data symbol slicing (non-clocked data symbol sampling) and delay function for DFE 314. For example, circuit 320 can quantize signal $V_{DIN\_EQ}$ and $VD_{DIN\_EQ}*$ into digital information. Delay circuit 325 can provide a time delay for the loop delay (e.g., fractional loop delay) for DFE 314. Delay circuit 325 can be configured such that its time delay can be tuned (e.g., configured) to achieve the loop delay (e.g., fractional loop delay) for DFE 314. Thus, the loop delay of DFE 314 is a configurable loop delay. Unlike some conventional DFEs, DFE 314 may use no sampling clock in its decision circuitry. For example, DFE 314 may not use a clock signal in circuit 320 and delay circuit 325 to sample data to generate information $D_{IN}$ and $D_{OUT\_DFE}$. This allows loop delay of DFE 314 to be a non-integer multiple of UI. Avoiding the use of a sampling clock in circuits 320 may also reduce power consumption in DFE 314, leading to relatively lower power consumption of receiver 304. Further, the 1-tap fine fractional structure of DFE 314 may also allow it to be less complex than some conventional DFEs. Moreover, receiver 304 may use a dock signal (e.g., a strobe signal) to) from a clock path (not shown in FIG. 3) to latch information $D_{OUT\_DFE}$ from the output of DFE 314 at a latch (not shown in FIG. 3). However. DFE 314 may not use such a dock signal to sample the data in circuit 320 and delay circuit 325 of DFE 314. Thus, such a clock signal can margin and detect the width of the eye opening of the signal that represent information $D_{OUT\_DFE}$ during testing (e.g., during tuning) of DFE 314.

As shown in FIG. 3, input circuit 312 can include LE 312a to perform an equalization operation (e.g., CTLE) operation on signals $V_{DIN}$ and $V_{REF}$. Input circuit 312 can be structured in a differential configuration. Signals $V_{DIN}$ and $V_{REF}$ can be an input differential pair at inputs of LE 312a. Signals $V_{DIN\_EQ}$ and $V_{DIN\_EQ}*$ can be an equalized output differential pair signal (small swing differential signal pair) at outputs (e.g., at nodes 315 and 316) of LE 312a.

Circuit 320 can operate to generate information (e.g., digital input information) $D_{IN}$ having value based on the values of signals $V_{DIN\_EQ}$ and $V_{DIN\_EQ}*$. Circuit 320 can include amplifier stages (e.g., limiting amplifiers) 321 and 322 that can operate to amplify signals $V_{DIN\_EQ}$ and $V_{DIN\_EQ}*$, a combiner 323 to combine the signals at the outputs of amplifier 322 and convert them into a single-ended signal at the output of combiner 323, and a buffer 324 (e.g., series-connected inverters) to receive a signal from the output of combiner 323 to generate information $D_{IN}$.

Delay circuit 325 can operate to receive information $D_{IN}$ and apply a time delay to information $D_{IN}$ to generate information $D_{OUT\_DFE}$ at a node 317. Information $D_{OUT\_DFE}$ is a delayed (time delayed) version of information $D_{IN}$. Information $D_{OUT\_DFE}$ and $D_{IN}$ have the same value. Delay circuit 325 can include delay elements 326 having respective output nodes 326a, 326b, 326c, and 326d. Each of delay elements 326 can provide a time delay. Each of delay elements 326 can be a variable (e.g., tunable) delay element. The time delay provided by each of delay elements 326 can be selected (e.g., by tuning the delay element) to be a particular value. Tuning delay elements 326 can be part of the tuning operation to provide loop delay (e.g., fractional loop delay) for DFE 314.

Output nodes 326a, 326b, 326c, and 326d can provide respective tapping points for delay circuit 325. FIG. 3 shows an example of four delay elements 326 and four tapping points at respective output nodes 326a, 326b, 326c, and 326d. The number of delay elements 326 and tapping points of delay circuit 325 can vary. The tapping points in delay circuit 325 can be selected during a tuning operation to provide the loop delay for DFE 314.

Delay circuit 325 can include a selector (e.g., multiplexor) 327, which can include input nodes (e.g., multiplexor input nodes) coupled to respective output nodes 326a, 326b, 326c, and 326d (e.g., tapping points of delay circuit 325). Selector 327 can also include an output node 327a, and a port (e.g., multiplexor control nodes) 327c. Port 327c can receive select information DFE_SEL, which can be represented by one or more signals (e.g., select signals). Based on the value of select information DFE_SEL, delay circuit 325 can selectively couple one of output nodes 326a, 326b, 326c, and 326d (e.g., one of the tapping points) to node 327a. Node 327a can provide feedback information DFE_FB, which is digital information. Feedback information DFE_FB can include a single bit (e.g., only one bit). For example, feedback information DFE_FB can have one value corresponding to logic 1 (e.g., binary 1) and another value corresponding to logic 0 (e.g., binary 0).

Adjust circuit 330 can include memory component (e.g., registers) 330a to store control code information CODE A, and memory component (e.g., registers) 330b to store control information CODE B. Each of control code information CODE A and CODE B can include codes (e.g., digital codes). Each of the codes can include bits.

During operation, based on the value (e.g., logic 1 or logic 0) of feedback information DFE_FB provided by delay circuit 325 on feedback loop 328, adjust circuit 330 can select at least one code from at least one of control code information CODE A and CODE B. Adjust circuit 330 can apply the selected code to adjust signals $V_{DIN\_EQ}$ and $V_{DIN\_EQ}$ (e.g., such as to reduce or eliminate signal reflection and ISI that may occur in signals $V_{DIN\_EQ}$ and $V_{DIN\_EQ}*$). This adjustment may also improve the quality (e.g., data eye opening) of the signal that represents information $V_{OUT\_DFE}$.

The value of information DFE_SEL provided to port 327c of selector 327 can be a fixed value during an operation (e.g., a normal operation) of DFE 314. The value (e.g., fixed value) of information DFE_SEL can be selected during a tuning operation (e.g., calibration operation) performed on DFE 314. For example, during a tuning operation, training information (e.g., training bits) can be provided to input circuit 312 (e.g., in the form of signal $V_{DIN}$). Different values (e.g., different combination of bits) of information DFE_SEL can be provided to port 327c during a tuning operation. Based on the values of information DFE_SEL during the tuning operation, selector 327 selectively couples output nodes 326a, 326b, 326c, and 326d (one at a time) to node 327a. The signal that represents information $V_{OUT\_DFE}$ during the tuning operation can be observed and analyzed (e.g., using electronic equipment). The value of information DFE_SEL selected to be used during a normal operation of DFE 314 can be the value of information DFE_SEL that provides the intended result (e.g., best result) for the signal that represents information $V_{OUT\_DFE}$ during the tuning operation. The intended result can include the best data eye diagram (e.g., eye opening), the data eye diagram that satisfies predetermined parameters, or other acceptable parameters associated with the intended result.

Figure 4:
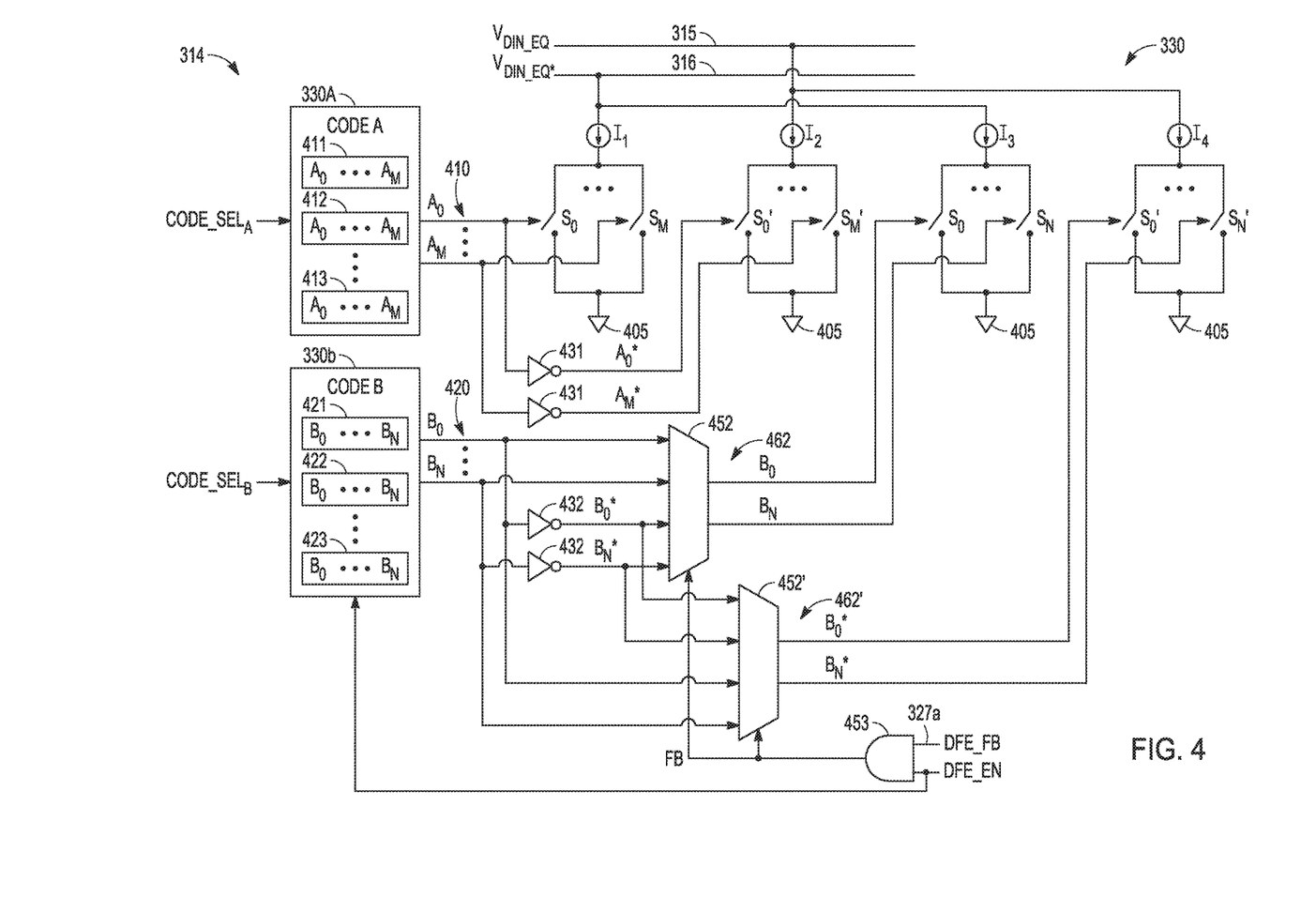
FIG. 4 shows a schematic diagram of an adjust circuit of the DFE of FIG. 3, according to some embodiments described herein.

FIG. 4 shows a schematic diagram of adjust circuit 330 of DFE 314 of FIG. 3, according to some embodiments described herein. Adjust circuit 330 can include switches $S_0$ through $S_M$ and switches $S_0$ through $S_N$ coupled in parallel on respective circuit paths between node 316 and node (e.g., ground connection) 405, and switches $S'_0$ through $S'_M$ and switches $S'_0$ through $S'_N$ coupled in parallel on respective circuit paths between node 315 and node 405. Each of switches $S_0$ through $S_M$, switches $S'_0$ through $S'_M$, switches $S_0$ through $S_N$, and switches $S'_0$ through $S'_N$ can include a transistor, which can be a metal-oxide semiconductor (MOS) transistor, such as n-channel (NMOS) transistor or p-channel PMOS transistor.

Switches $S_0$ through $S_M$ and switches $S'_0$ through $S'_M$ can be included as part of off-set correction circuitry of DFE 314 to offset any noise (e.g., random noise) that may be developed at nodes 315 and 316 during operation of receiver 304 when no signal is provided to the input of input circuit 312. In some arrangements, switches $S_0$ through $S_M$ and switches $S'_0$ through $S'_M$ (and their connections to nodes 315 and 316) can be omitted from (e.g., or alternatively not used in) DFE 314 if there is negligible noise (or no noise) at nodes 315 and 316 during operation of receiver 304 when no signal is provided to the input of input circuit 312. As shown in FIG. 4, switches $S_0$ through $S_M$ can be controlled (e.g., turned on or turned off) by bits $A_0$ through $A_M$ (at nodes 410), respectively. Switches $S'_0$ through $S'_M$ can be controlled (e.g., turned on or turned off) by bits $A*_0$ through $A*_M$, respectively. Bits $A_0$ through $A_M$ and $A*_0$ through $A*_M$ can have complementary values (e.g., based on operations of inverters 431). For example, if bits $A_0$ through $A_M$ have a value of 0000011111 (binary value), then bit $A*_0$ through $A*_M$ have a value of 1111100000.

Switches $S_0$ through $S_N$ and switches $S'_0$ through $S'_N$ can be included as part of feedback loop 328 (FIG. 3) used in operations of DFE 314. As shown in FIG. 4, switches $S_0$ through $S_N$ can be controlled (e.g., turned on or turned off) by bits $B_0$ through $B_N$ (at nodes 420), respectively. Switches $S'_0$ through $S'_N$ can be controlled (e.g., turned on or turned off) by bits $B*_0$ through $B*_N$ respectively. Bits $B_0$ through $B_N$ and $B*_0$ through $B*_N$ can have complementary values (e.g., based on operations of inverters 432). For example, if bits $B_0$ through $B_N$ have a value of 00000001 (binary value), then bit $B*_0$ through $B*_N$ have a value of 11111110.

Adjust circuit 330 can include multiplexors 452 and 452' that can respond to select information FB (multiplexor select information) from an output of logic circuit (e.g., logic AND gate) 453. Logic circuit 453 can include inputs to receive information (e.g., DFE enable signal) DFE_EN and feedback information DFE_FB. During a normal operation of DFE 314, information DFE_EN can have a value (e.g., logic 1), such that the value (e.g., logic 1 or 0) of select information FB follows (e.g., is the same as) the value (e.g., logic 1 or 0) of feedback information DFE_FB.

Control code information CODE A can include codes 411, 412, and 413. Each of codes 411, 412, and 413 include bits $A_0$ through $A_M$. The number bits $A_0$ through $A_M$ of codes 411, 412 and 413 can be the same. However, the value (binary combination value) of bits $A_0$ through $A_M$ of codes 411, 412, and 413 are different from one code to another. For example, if each of codes 411, 412, and 413 has 10 bits (e.g., $A_0$ through $A_9$), then the values of codes 411, 412, and 413 can be 000000000, 000000001, and 0000000011, respectively. FIG. 4 shows an example where control code information CODE A has three codes (411, 412, and 413) as an example. The number of codes in control code information CODE A can vary.

The value of bits $A_0$ through $A_M$ at nodes 410 can be the value of bits $A_0$ through $A_M$ of one of codes 411, 412, and 413. Select information (e.g., digital information) CODE_$SEL_A$ can be used to select a code (e.g., selected code) among codes 411, 412, 413 to be provided to nodes 410. Memory component 330a can include a decoder that can decode the value (e.g., a combination of bits) of information CODE_$SEL_A$ to select one of codes 411, 412, and 413 to be the provided to node 410.

Switches $S_0$ through $S_M$ and switches $S'_0$ through $S'_M$ are arranged and controlled by bits $A_0$ through $A_M$ and $A*_0$ through $A*_M$ (having complementary values), such that the number of switches $S_0$ through $S_M$ that are turned on can be equal to the number of switches $S'_0$ through $S'_M$ that are turned off (which also means that the number of switches $S_0$ through $S_M$ that are turned off can be equal to the number of switches $S'_0$ through $S'_M$ that are turned on). This allows balancing the change (e.g., an increase) in the amount of currents $I_1$ (between nodes 316 and 405) with the change (e.g., a decrease) in the amount of current $I_2$ (between nodes 315 and 405). This balancing of the changes in currents $I_1$ and $I_2$ allows a proper equalization operation to be performed on signals $V_{DIN\_EQ}$ and $V_{DIN\_EQ}*$ at nodes 315 and 316.

In a normal operation of DFE 314, although the number of switches $S_0$ through $S_M$ that are turned on can be equal to the number of switches $S'_0$ through $S'_M$ that are turned off, the number of turned-on switches within the same group (e.g., either in the group of switches $S_0$ through $S_M$ or in the group of switches $S'_0$ through $S'_M$) can be different from the number of turned-off switches. For example, in a normal operation, the value of bits $A_0$ through $A_M$ at node 410 may be a value different from 0000011111, so that the purpose of off-set correction (e.g., random noise reduction) may be maintained.

The value of bits $A_0$ through $A_M$ at nodes 410 can be a fixed value during (e.g., normal) operation of DFE 314. The value (e.g., fixed value) of bits $A_0$ through $A_M$ can be selected during a tuning operation (e.g., calibration operation) performed on DFE 314. For example, during a tuning operation, training information (e.g., training bits) can be provided to input circuit 312 (e.g., in the form of signal $V_{DIN}$ in FIG. 3). Different codes (e.g., codes 411, 412, and 413) included in control code information CODE A can be provided to nodes 410 (one at a time) based on the value of select information $CODE\_SEL_A$. The signal that represents information $D_{OUT\_DFE}$ during the tuning operation can be observed and analyzed (e.g., using electronic equipment). The value of select information $CODE\_SEL_A$ selected to be used during a normal operation of DFE 314 can be the value of information $CODE\_SEL_A$ that causes the difference between signals $V_{DIN\_EQ}$ and $V_{DIN\_EQ}*$ during the tuning operation to be zero (or close to zero), which means that value information $D_{OUT\_DFE}$ during the tuning operation is also zero.

Control code information CODE B can include codes 421, 422, and 423. Each of codes 421, 422, and 423 include bits $B_0$ through $B_N$. The number of bits $B_0$ through $B_N$ of codes 421, 422, and 423 can be the same. However, the value (binary combination value) of bits $B_0$ through $B_N$ of codes 421, 422, and 423 are different from one code to another. For example, if each of codes 421, 422, and 423 has eight bits (e.g., $B_0$ through $B_7$), then the values of codes 421, 422, and 423 can be 0000000, 0000001, and 00000011, respectively. FIG. 4 shows an example where control code information CODE B has three codes (421, 422, and 423) as an example. The number of codes in CODE B can vary.

The value of bits $B_0$ through $B_N$ at nodes 420 can be one of the value of bits $B_0$ through $B_N$ of one of codes 421, 422, and 423. Select information (e.g., digital information) $CODE\_SEL_B$ can be used to select a code (e.g., selected code) among codes 411, 412, 413 to be provided to nodes 410. Memory component 330b can include a decoder that can decode the value (e.g., a combination of bits) of information $CODE\_SEL_B$ to select one of codes 411, 412, and 413 to be provided to node 420.

The value of bits $B_0$ through $B_N$ at nodes 420 can be a fixed value during (e.g., normal) operation of DFE 314. The value (e.g., fixed value) of bits $B_0$ through $B_N$ can be selected during a tuning operation (e.g., calibration operation) performed on DFE 314 in ways similar to the selection of information DFE_SEL (FIG. 3). For example, during a tuning operation, training information (e.g., training bits) can be provided to input circuit 312 (e.g., in the form of signal $V_{DIN}$ in FIG. 3). Different codes (e.g., codes 421, 422, and 423) included in control code information CODE B can be provide to nodes 420 (one at a time) based on the value of select information $CODE\_SEL_B$. The signal that represents information $D_{OUT\_DFE}$ during the tuning operation can be observed and analyzed (e.g., using electronic equipment). The value of select information $CODE\_SEL_B$ selected to be used during a normal operation of DFE 314 can be the value of information $CODE\_SEL_B$ that provides the intended result (e.g., best result) for the signal that represents information $D_{OUT\_DFE}$ during the tuning operation. The intended result can include the best data eye diagram (e.g., eye opening), the date eye diagram that satisfies predetermined parameters, or other acceptable parameter associated with the intended result.

Multiplexors 452 and 452' and switches $S_0$ through $S_N$ and switches $S'_0$ through $S'_N$ are arranged and controlled by bits $B_0$ through $B_N$ and $B*_0$ through $B*_N$, such that the number of switches $S_0$ through $S_N$ that are turned on can be equal to the number of switches $S'_0$ through $S'_N$ that are turned off, and the number of switches $S_0$ through $S_N$ that are turned off can be equal to the number of switches $S'_0$ through $S'_N$ that are turned on. This allows balancing the change (e.g., an increase) in the amount of currents $I_3$ (between nodes 316 and 405) with the change (e.g., a decrease) in the amount of current $I_4$ (between nodes 315 and 405). This balancing of the changes in currents $I_3$ and $I_4$ allows a proper equalization operation to be performed on signals $V_{DIN\_EQ}$ and $V_{DIN\_EQ}*$ at nodes 315 and 316.

As shown in FIG. 4, multiplexors 452 and 452' can respond to the same select information FB. For example, if FB=1 (the value of information FB is logic 1), then multiplexor 452 can select bits $B_0$ through $B_N$ at nodes 420 and provide bits $B_0$ through $B_N$ to nodes 462 (output nodes of multiplexor 452). Multiplexor 452' can select bits $B*_0$ through $B*_N$ at outputs of inverters 432 and provide bits $B*_0$ through $B*_N$ to nodes 462' (output nodes of multiplexor 452'). In another example, if FB=0 (the value of information FB is logic 0), then multiplexor 452 can select bits $B*_0$ through $B*_N$ at outputs of inverters 432 and provide bits $B*_0$ through $B*_N$ to nodes 462. Multiplexor 452' can select bits $B_0$ through $B_N$ at nodes 420 and provide bits $B_0$ through $B_N$ to nodes 462'.

In a normal operation of DFE 314, although the number of switches $S_0$ through $S_M$ that are turned on can be equal to the number of switches $S'_0$ through $S'_N$ that are turned off, the number of turned-on switches within the same group (e.g., either in the group of switches $S_0$ through $S_N$ or in the group of switches $S'_0$ through $S'_N$) can be different from the number of turned-off switches. For example, in a normal operation, the value of bits $B_0$ through $B_N$ at node 420 may be a value different from 000011111, so that the purpose of DFE 314 operation is maintained.

In some operations (e.g., testing operations), the value of bits $B_0$ through $B_N$ at node 420 may be selected such that the number of logic 0 bits can be the same of as the number of logic 1 bits (e.g., 000011111). This means that the number of turned-on switches within the same group (e.g., either in switches $S_0$ through $S_N$ or in switches $S'_0$ through S'N) can be the same as the number of turned-off switches. This may, in effect, neutralize (e.g., disable) the operation of DFE 314 from receiver 304 (FIG. 3). For example, in a test operation, information DFE_EN can have a value (e.g., logic 0), such that a decoder in memory component 330b selects (e.g., automatically selects) a code (e.g., a middle code among codes 411, 412, and 413) that has a value of 00001111.

Figure 5:
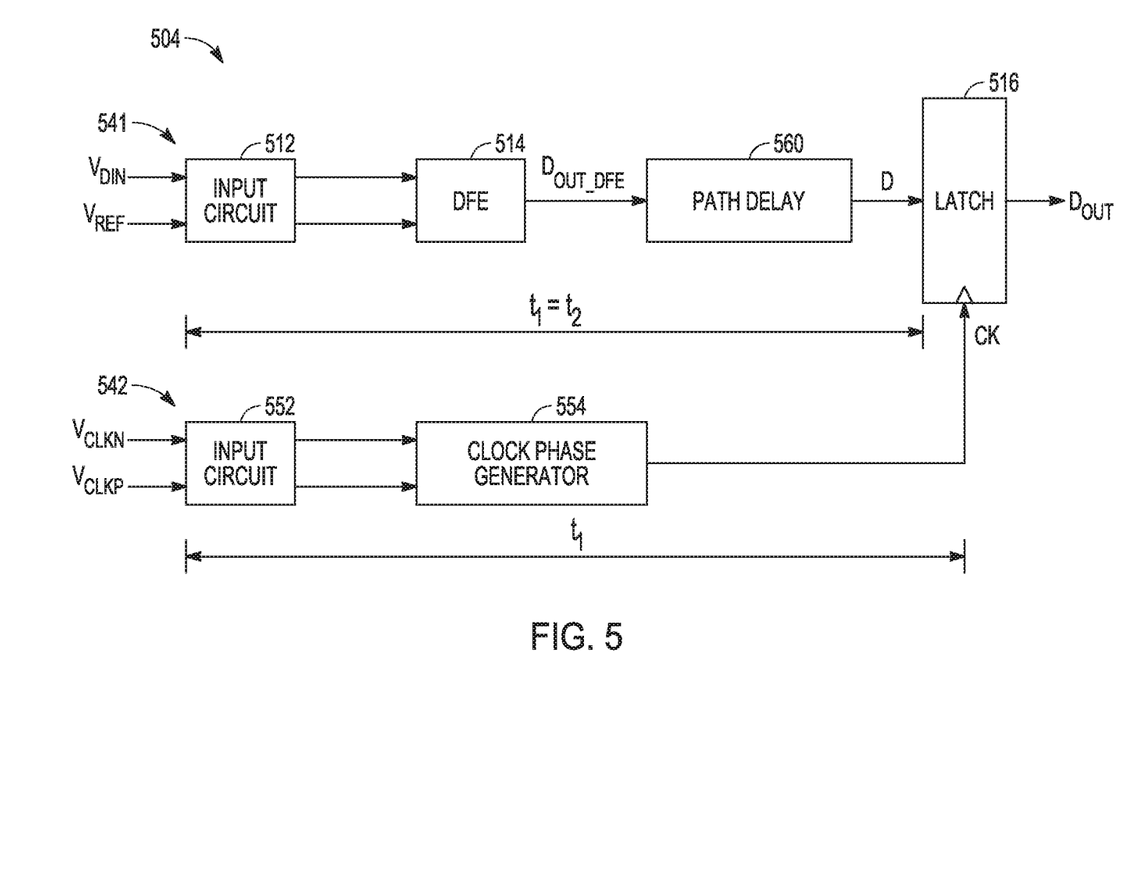
FIG. 5 shows a block diagram of a receiver including a data path and a clock path, according to some embodiments described herein.

FIG. 5 shows a block diagram of a receiver 504 including a data path 541 and a clock path 542, according to some embodiments described herein. Data path 541 can operate to receive signals (e.g., analog input signals) $V_{DIN}$ and $V_{REF}$, generate data information (e.g., digital output information) D and provide it to a latch 516. The value of data information D (e.g., bits of data) is based on the value of signal $V_{DIN}$. Clock path 542 can operate to receive clock signals $V_{CLKN}$ and $V_{CLKP}$ (e.g., differential clock signal pair), which are clock signals associated with signal $V_{DIN}$. Clock path 542 can provide clock information CK (e.g., clock phases represented by a clock signal) based on clock signals $V_{CLKN}$ and $V_{CLKP}$. Receiver 504 uses the timing of clock information CK to latch data information D at latch 516 at an appropriate time (e.g., based on timing of information CK).

Signals $V_{DIN}$ and $V_{REF}$ can correspond to signals $V_{DIN}$ through $V_{REF}$ of FIG. 3. Signal $V_{DIN}$ can be provided to receiver 504 by a transmitter, such as transmitter 105 of FIG. 1. Signals $V_{CLKN}$ and $V_{CLKP}$ in FIG. 5 can correspond to signals $V_{CLKN}$ and $V_{CLKP}$ provided by transmitter 105 of FIG. 1.

In FIG. 5, time amount t1 represents an amount of time (e.g., a fraction of a second) lapsed from a receipt of signal $V_{DIN}$ at receiver 504 to the occurrence of data information D at latch 516. Time amount t1 can be called the time delay of data path 541. Time amount t2 represents an amount of time (e.g., a fraction of a second) lapsed from a receipt of signals $V_{CLKN}$ and $V_{CLKP}$ at receiver 504 to the occurrence of clock information CK at latch 516. Time amount t2 can be called the time delay of clock path 542.

Data path 541 and clock path 542 can be arranged, such that data path 541 and clock path 542 can have a matched time delay. This means that time amounts t1 and t2 can be equal to each other (e.g., t1=t2). This may allow data information D to be accurately latched (received) at latch 516.

As shown in FIG. 5, data path 541 can include an input circuit 512, a DFE 514, and a path delay component 560. Input circuit 512 and DFE 514 can include components and operations similar to (or the same as) that of input circuit 312 and DFE 314, respectively, of FIG. 3. Thus, DFE 514 can be an un-sampled DFE and information DFE_OUT of FIG. 5 can correspond to information DFE_OUT of FIG. 3. As described above, receiver 504 may use the timing of clock information CK to latch data information D at latch 516. However, receiver 504 may not use signals $V_{CLKN}$ and $V_{CLKP}$ or clock information CK in DFE 514 to sample the data signal in DFE 514. For example, DFE 514 may perform DFE operations in ways similar to that of DFE 314 (FIG. 4) to generate digital input information (e.g., $D_{IN}$) and digital output information (e.g., $D_{OUT\_DFE}$) without using clock signals $V_{CLKN}$ and $V_{CLKP}$ (or without using a clock signal derived from clock signals $V_{CLKN}$ and $V_{CLKP}$) in the generation of the digital input and output information. This means that in DFE 514, clock signals $V_{CLKN}$ and $V_{CLKP}$ (associated with signal $V_{DIN}$) can be decoupled from (e.g., not used in) DFE 514, such as decoupled circuits (similar to circuit 320 and delay circuit 325 of FIG. 3) of DFE 514.

Path delay component 560 is an additional delay circuit different from delay circuit 325 of FIG. 3. Path delay component 560 can include components (e.g., delay elements that can provide a time delay to delay the signal that represent information DFE_OUT. Path delay component 560 is included in data path 541 to provide a time delay. The amount of the time delay provided by path delay component 560 can be selected (e.g., adjusted), such that time amount t1 can match (e.g., can be equal to) time amount t2. In some arrangement of receiver 504, path delay component 560 can be omitted from receiver 504 and information DFE_OUT can be provided directly to latch 516 if time amount t1 is equal to time amount t2 without path delay component 560.

Clock path 542 can include an input circuit 552 and a clock generator 554. Input circuit 512 can include components and operations similar to (or the same as) that of input circuit 312 of FIG. 3. For example, input circuit 552 can include linear equalizers to equalize (e.g., reduce noise) clock signals $V_{CLKN}$ and $V_{CLKP}$ and generate equalized signals and provide them to clock generator 554. Although not shown in FIG. 5, clock generator 554 can include off-set correction circuitry to off-set random noise to improve the quality of the signals provided by input circuit 552. Clock generator 554 may also include amplifier stages to amplify the signals provided to it by input circuit 552 and generate amplified signals, and delay-locked loop or clock phase interpolation circuitry (or both), to generate clock information CK based on the amplified signals.

As described above, some conventional DFEs use a sampling clock signal to sample data. Thus, in some conventional DFEs, changing the time delay of the data path (e.g., to match the time delay of clock path) may be difficult (or impossible) because of the timing of the sampling clock signal used in the sampling of the data. In data path 541 of FIG. 5, since the DFE 514 uses no clock signal to sample data, including path delay component 560 in data path 541 to adjust the time delay of data path 541 (to match time amount t1 with time amount t2) can be possible. This further improves the latching of data information D at latch 516.

Figure 6:
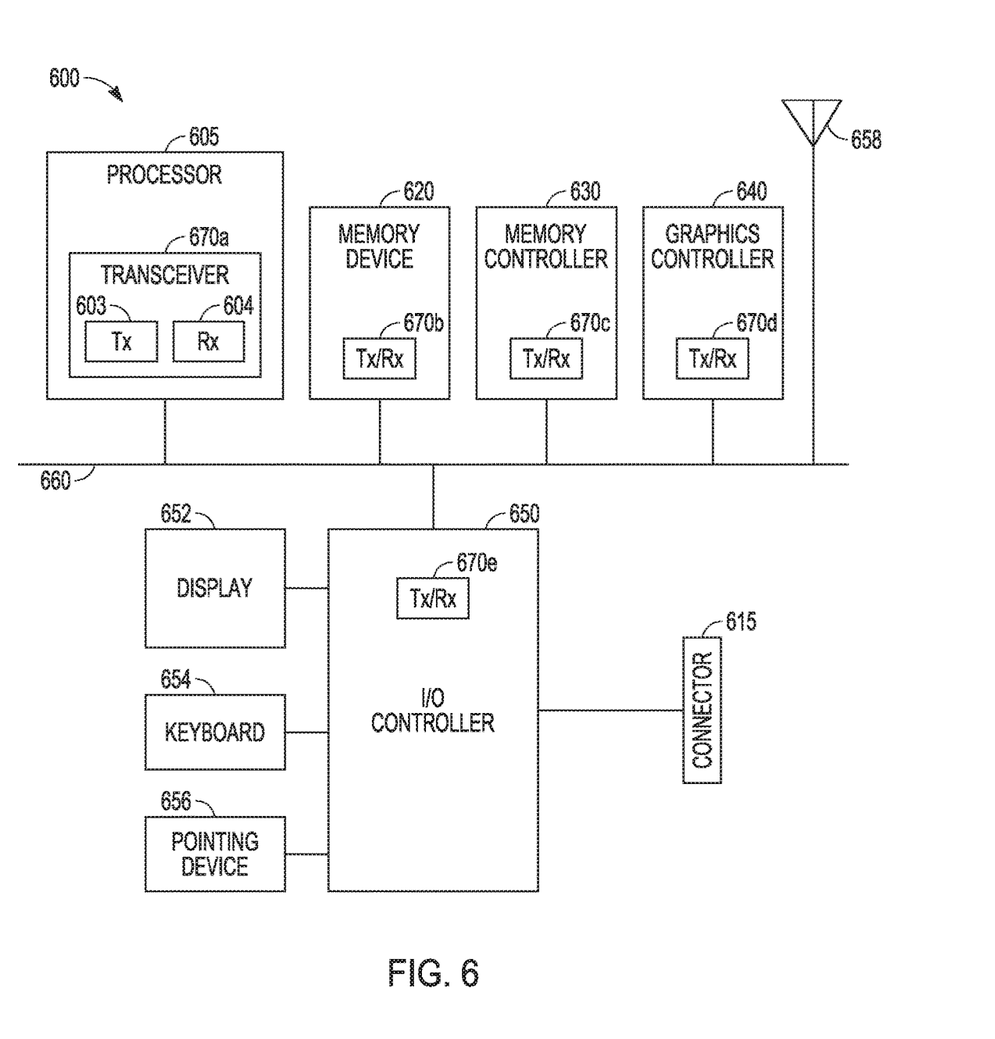
FIG. 6 shows an apparatus in the form of an electronic system, according to some embodiments described herein

FIG. 6 shows an apparatus in the form of a system (e.g., electronic system) 600, according to some embodiments described herein. System 600 can include or be included in a computer, a tablet, or other electronic systems. As shown in FIG. 6, system 600 can include components, such as a processor 605, a memory device 620, a memory controller 630, a graphics controller 640, an input and output (I/O) controller 650, a display 652, a keyboard 654, a pointing device 656, at least one antenna 658, a connector 615, and a bus 660. Bus 660 can include conductive lines (e.g., metal-based traces on a circuit board where the components of system 600 are located).

In some arrangements, system 600 does not have to include a display. Thus, display 652 can be omitted from system 600. In some arrangements, system 600 does not have to include any antenna 658. Thus, antenna 658 can be omitted from system 600.

Processor 605 can include a general-purpose processor or an application specific integrated circuit (ASIC). Processor 605 can include a CPU.

Memory device 620 can include a DRAM device, a static random access memory (SRAM) device, a flash memory device, phase change memory, a combination of these memory devices, or other types of memory. FIG. 6 shows an example where memory device 620 is a stand-alone memory device separated from processor 605. In an alternative arrangement, memory device 620 and processor 605 can be located on the same die. In such an alternative arrangement, memory device 620 is an embedded memory in processor 605, such as embedded DRAM (eDRAM), embedded SRAM (eSRAM), embedded flash memory, or another type of embedded memory.

Display 652 can include a liquid crystal display (LCD), a touchscreen (e.g., capacitive or resistive touchscreen), or another type of display. Pointing device 656 can include a mouse, a stylus, or another type of pointing device.

I/O controller 650 can include a communication module for wired or wireless communication (e.g., communication through one or more antenna 658). Such wireless communication may include communication in accordance with WiFi communication technique, Long Term Evolution Advanced (LTE-A) communication technique, or other communication techniques.

I/O controller 650 can also include a module to allow system 600 to communicate with other devices or systems in accordance with to one or more of the following standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), and other specifications.

Connector 615 can be arranged (e.g., can include terminals, such as pins) to allow system 600 to be coupled to an external device (or system). This may allow system 600 to communicate (e.g., exchange information) with such a device (or system) through connector 615.

Connector 615 and at least a portion of bus 660 can include conductive lines that conform with at least one of USB, DP, HDMI, Thunderbolt, PCIe, and other specifications.

As shown in FIG. 6, processor 605 can include a transceiver (Tx/Rx) 670a having a transmitter (Tx) 603 and a receiver (Rx) 604. Transmitter 603 can operate to transmit information from processor 605 to another part of system 600 or to an external device (or system) coupled to connector 615. Receiver 604 of processor 605 can operate to receive information from another part of system 600 or from an external device (or system) coupled to connector 615. For example, receiver 604 can receive information (e.g., data and clock signals) from one or more of memory device 620, memory controller 630, graphics controller 640, and I/O controller 650. Receiver 604 can include components and operation of any of the receivers described above with reference to FIG. 1 through FIG. 5.

As shown in FIG. 6, memory device 620, memory controller 630, graphics controller 640, and I/O controller 650 can include transceivers 670b, 670c, 670d, and 670e, respectively, to allow each of these components to transmit and receive information through their respective transceiver. At least one of transceivers 670b, 670c, 670d, and 670e can be similar to or identical to transceiver 670a. Thus, at least one of transceivers 670b, 670c, 670d, and 670e can include a receiver similar to or identical to receiver 604. For example, at least one of transceivers 670b, 670c, 670d, and 670e can include a receiver that can be arranged to allow at least one of memory device 620, memory controller 630, graphics controller 640, and I/O controller 650 to receive information (e.g., data and clock signals) from another part of system 600 or from an external device (or system) coupled to connector 615.

FIG. 6 shows the components of system 600 arranged separately from each other as an example. For example, each of processor 605, memory device 620, memory controller 630, graphics controller 640, and I/O controller 650 can be located on a separate IC (e.g., semiconductor die or an IC chip). In some arrangements, two or more components (e.g., processor 605, memory device 620, graphics controller 640, and I/O controller 650) of system 600 can be located on the same die (e.g., same IC chip) that forms a system-on-chip (SoC).

Figure 7:
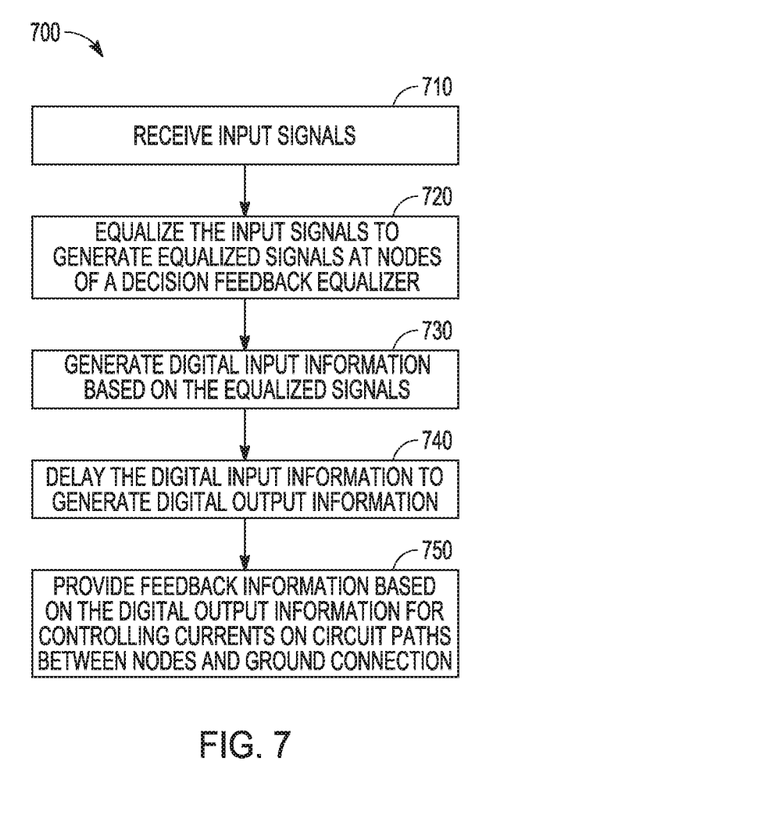
FIG. 7 is a flowchart showing a method of operating a receiver, according to some embodiments described herein.

FIG. 7 is a flowchart showing a method 700 of operating a receiver, according to some embodiments described herein. The receiver used in method 700 can include any of the receivers described above with reference to FIG. 1 through FIG. 6. Some of the activities in method 700 may be performed by hardware, software, firmware, or any combination of hardware, software, and firmware. Such by hardware, software, and firmware can be included in the receiver or the device or system that include the receiver.

As shown in FIG. 7, activity 710 of method 700 can include receiving input signals at a receiver. Activity 720 can include equalizing the input signals to generate equalized signals at nodes of a DFE of the receiver. Activity 730 can include generating digital input information based on the equalized signals. Activity 740 can include delaying the digital input information to generate digital output information. Activity 750 can include providing feedback information based on the digital output information for controlling currents on circuit paths between nodes and a ground connection.

Method 700 can include fewer or more activities relative to activities 710, 720, 730, 740, and 750 shown in FIG. 7. For example, method 700 can include activities and operations of receivers including DFEs described above with reference to FIG. 1 through FIG. 6.

The illustrations of the apparatuses (e.g., apparatus 100 including receivers 104 and receiver 304, and system 600) and methods (e.g., method 700 and operations of receivers 104 and receiver 304, and system 600) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor module or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group. Audio Layer 3) players), vehicles, medical devices (e.g., heart monitors, blood pressure monitors, etc.), set top boxes, and others.

Additional Notes and Examples

Example 1 includes subject matter (such as a device, an electronic apparatus (e.g., circuit, electronic system, or both), or a machine) including a first circuit to receive an input signal and generate an equalized signal to a node, a second circuit to amplify the equalized signal and generate digital input information, a delay circuit including delay elements to apply a time delay to the digital input information and generate digital output information, and a selector to provide feedback information from an output node of one of the delay elements, and an adjust circuit including switches on circuit paths coupled to the node, the adjust circuit to control the switches based on the feedback information.

In Example 2, the subject matter of Example 1 may optionally include, a clock path to receive a clock signal associated with the input signal, wherein the clock signal is decoupled from the second circuit and the delay circuit.

In Example 3, the subject matter of Example 1 may optionally include, wherein the switches include a first switch coupled between the node and a ground connection, and a second switch coupled between the node and the ground connection.

In Example 4, the subject matter of Example 3 may optionally include, wherein the adjust circuit is to store a code including bits to control the first and second switches.

In Example 5, the subject matter of Example 4 may optionally include, wherein the adjust circuit is to select a value of the code based on the value of the feedback information.

In Example 6, the subject matter of any of Examples 1-5 may optionally include, the first circuit, the second circuit, the delay circuit, and the adjust circuit are part of a data path of the apparatus, the data path arranged to provide data information, based on the digital output information, to a latch coupled to the data path, the data path including a path delay component coupled between the delay circuit and the latch to provide a time delay.

In Example 7, the subject matter of Example 6 may optionally include, a clock path coupled to the latch, wherein the data path and the clock path have a matched time delay.

Example 8 includes subject matter (such as a device, an electronic apparatus (e.g., circuit, electronic system, or both), or a machine) including a linear equalizer to receive input signals and generate equalized signals, and a decision feedback equalizer including nodes to receive the equalized signals, a circuit to amplify the equalized signals to generate digital input information, a delay circuit including delay elements to apply a time delay to the digital input information and generate digital output information, and a feedback loop to control an amount of current on circuit paths between the nodes and a ground connection based on feedback information provided from the delay circuit.

In Example 9, the subject matter of Example 8 may optionally include, wherein the decision feedback equalizer is included in a receiver, and the decision feedback equalizer is configured to decouple a dock signal, received at the receiver, from the delay circuit and from a circuit of the DFE that generates the digital input information.

In Example 10, the subject matter of any of Examples 8 or 9 may optionally include, wherein the delay circuit includes a selector to provide the feedback information from an output node of one of the delay elements of the delay circuit.

In Example 11, the subject matter of any of Examples 8 or 9 may optionally include, wherein the delay circuit is configured, such that the time delay applied by the delay circuit is equal to X times T, where X is greater than one and is a non-integer, and T is equal to one unit interval of the input signals.

In Example 12, the subject matter of Example 8 may optionally include, wherein the nodes include a first node and a second node, and the DFE includes a first switch coupled between the first node and a ground connection, a second switch coupled between the second node and the ground connection, and a memory component to store a code to control the first and second switches.

In Example 13, the subject matter of Example 12 may optionally include, wherein the first and second switches are controlled by bits of the code, and the bits have complementary values.

In Example 14, the subject matter of Example 13 may optionally include, wherein the DFE includes a third switch coupled between the first node and a ground connection, a fourth switch coupled between the second node and the ground connection, and an additional memory component to store an additional code to control the third and fourth switches.

In Example 15, the subject matter of Example 14 may optionally include, wherein the third and fourth switches are controlled by bits of the additional code, and the bits have complementary values.

Example 16 includes subject matter (such as a device, an electronic apparatus (e.g., circuit, electronic system, or both), or a machine) including conductive lines on a circuit board, a memory device coupled to the conductive lines, and a processor coupled to the conductive lines, the processor including a first circuit to receive an input signal and generate an equalized signal to a node, a second circuit to amplify the equalized signal and generate digital input information, a delay circuit including delay elements to apply a time delay to the digital input information and generate digital output information, and a selector to provide feedback information from an output node of one of the delay elements, and an adjust circuit including switches on circuit paths coupled to the node, the adjust circuit to control the switches based on the feedback information.

In Example 17, the subject matter of Example 16 may optionally include, wherein the second circuit, the delay circuit, and the adjust circuit are part of a decision feedback equalizer of the processor.

In Example 18, the subject matter of Example 17 may optionally include, wherein the first circuit includes a continuous time linear equalizer.

In Example 19, the subject matter of Example 18 may optionally include, wherein the continuous time linear equalizer and the decision feedback equalizer are part of a data path included in a receiver of the processor.

In Example 20, the subject matter of Example 19 may optionally include, wherein a portion of the conductive lines is configured to carry at least one clock signal associated with the input signal from the memory device to a clock path of the processor, and the data path includes a path delay component to provide a time delay such that a time delay of the data path matches the time delay of the clock path.

Example 21 includes subject matter (such as a method of operating a device, an electronic apparatus (e.g., circuit, electronic system, or both), or a machine) including receiving input signals, equalizing the input signals to generate equalized signals at nodes of a decision feedback equalizer, generating digital input information based on the equalized signals, delaying the digital input information to generate digital output information, and providing feedback information based on the digital output information for controlling currents on circuit paths between nodes and a ground connection.

In Example 22, the subject matter of Example 21 may optionally include, wherein generating the digital input information and the digital output information is performed at the decision feedback equalizer without using a clock signal associated with the input signals.

In Example 23, the subject matter of any of Example 21 or 22 may optionally include, wherein delaying the digital input information includes providing a time delay such that a loop delay of the decision feedback equalizer is a non-integer multiple of a unit time interval of one of the input signals.

In Example 24, the subject matter of any of Examples 21 or 22 may optionally include, wherein controlling the currents on the circuit paths includes selecting a code to control a first switch on a first circuit path among the circuit paths and a second switch on a second circuit path among the circuit paths.

In Example 25, the subject matter of Example 24 may optionally include, wherein controlling the currents on the circuit paths includes selecting another code to control a third switch on a third circuit path among the circuit paths and a fourth switch on a fourth circuit path among the circuit paths.

Example 26 includes subject matter (such as a device, an electronic apparatus (e.g., circuit, electronic system, or both), or machine) including means for performing any of the methods of claims 21-25.

The subject matter of Example 1 through Example 26 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
    a first circuit to receive an input signal and generate an equalized signal to a node;
    a second circuit to amplify the equalized signal and generate digital input information;
    a delay circuit including delay elements to apply a time delay to the digital input information and generate digital output information, and a selector to provide feedback information from an output node of one of the delay elements; and
    an adjust circuit including switches on circuit paths coupled to the node, the adjust circuit to control the switches based on the feedback information.

2. The apparatus of claim 1, further comprising a clock path to receive a clock signal associated with the input signal, wherein the clock signal is decoupled from the second circuit and the delay circuit.

3. The apparatus of claim 1, wherein the switches include a first switch coupled between the node and a ground connection, and a second switch coupled between the node and the ground connection.

4. The apparatus of claim 3, wherein the adjust circuit is to store a code including bits to control the first and second switches.

5. The apparatus of claim 4, wherein the adjust circuit is to select a value of the code based on the value of the feedback information.

6. The apparatus of claim 1, wherein the first circuit, the second circuit, the delay circuit, and the adjust circuit are part of a data path of the apparatus, the data path arranged to provide data information, based on the digital output information, to a latch coupled to the data path, the data path including a path delay component coupled between the delay circuit and the latch to provide a time delay.

7. The apparatus of claim 6, further comprising a clock path coupled to the latch, wherein the data path and the clock path have a matched time delay.

8. An apparatus comprising:
    a linear equalizer to receive input signals and generate equalized signals; and
    a decision feedback equalizer including nodes to receive the equalized signals, a circuit to amplify the equalized signals to generate digital input information, a delay circuit including delay elements to apply a time delay to the digital input information and generate digital output information, and a feedback loop to control an amount of current on circuit paths between the nodes and a ground connection based on feedback information provided from the delay circuit.

9. The apparatus of claim 8, wherein the decision feedback equalizer is included in a receiver, and the decision feedback equalizer is configured to decouple a clock signal, received at the receiver, from the delay circuit and from a circuit of the DFE that generates the digital input information.

10. The apparatus of claim 8, wherein the delay circuit includes a selector to provide the feedback information from an output node of one of the delay elements of the delay circuit.

11. The apparatus of claim 8, wherein the delay circuit is configured, such that the time delay applied by the delay circuit is equal to X times T, where X is greater than one and is a non-integer, and T is equal to one unit interval of the input signals.

12. The apparatus of claim 8, wherein the nodes include a first node and a second node, and the DFE includes:
    a first switch coupled between the first node and a ground connection;
    a second switch coupled between the second node and the ground connection, and
    a memory component to store a code to control the first and second switches.

13. The apparatus of claim 12, wherein the first and second switches are controlled by bits of the code, and the bits have complementary values.

14. The apparatus of claim 13, wherein the DFE includes:
    a third switch coupled between the first node and a ground connection;
    a fourth switch coupled between the second node and the ground connection; and
    an additional memory component to store an additional code to control the third and fourth switches.

15. The apparatus of claim 14, wherein the third and fourth switches are controlled by bits of the additional code, and the bits have complementary values.

16. An electronic system comprising:
    conductive lines on a circuit board;
    a memory device coupled to the conductive lines; and
    a processor coupled to the conductive lines, the processor including:
        a first circuit to receive an input signal and generate an equalized signal to a node;
        a second circuit to amplify the equalized signal and generate digital input information;
        a delay circuit including delay elements to apply a time delay to the digital input information and generate digital output information, and a selector to provide feedback information from an output node of one of the delay elements; and
        an adjust circuit including switches on circuit paths coupled to the node, the adjust circuit to control the switches based on the feedback information.

17. The electronic system of claim 16, wherein the second circuit, the delay circuit, and the adjust circuit are part of a decision feedback equalizer of the processor.

18. The electronic system of claim 17, wherein the first circuit includes a continuous time linear equalizer.

19. The electronic system of claim 18, wherein the continuous time linear equalizer and the decision feedback equalizer are part of a data path included in a receiver of the processor.

20. The electronic system of claim 19, wherein a portion of the conductive lines is configured to carry at least one clock signal associated with the input signal from the memory device to a clock path of the processor, and the data path includes a path delay component to provide a time delay such that a time delay of the data path matches the time delay of the clock path.

\* \* \* \* \*